US012164909B2

United States Patent
Untersander et al.

(10) Patent No.: US 12,164,909 B2
(45) Date of Patent: Dec. 10, 2024

(54) APPLICATION ICON GENERATION BASED ON UNIQUE APPLICATION PROPERTY REPRESENTATION

(71) Applicant: Salesforce, Inc., San Francisco, CA (US)

(72) Inventors: Sandra Mariana Untersander, Ciudad Autónoma de Buenos Aires (AR); Agustin Alexander, Pilar (AR); Marcelo Hernán Cominguez, Buenos Aires (AR); Marcelo Adrián Origoni Pouso, Vicente Lopez (AR)

(73) Assignee: Salesforce, Inc., San Francisco, CA (US)

( * ) Notice: Subject to any disclaimer, the term of this patent is extended or adjusted under 35 U.S.C. 154(b) by 245 days.

(21) Appl. No.: 17/576,425

(22) Filed: Jan. 14, 2022

(65) Prior Publication Data

US 2023/0229433 A1 Jul. 20, 2023

(51) Int. Cl.
*G06F 8/71* (2018.01)
(52) U.S. Cl.
CPC .................. *G06F 8/71* (2013.01)
(58) Field of Classification Search
CPC .......................................... G06F 8/71
USPC ................................. 717/109–140
See application file for complete search history.

(56) References Cited

U.S. PATENT DOCUMENTS

| | | | | |
|---|---|---|---|---|
| 5,603,034 A * | 2/1997 | Swanson | ............... | G06F 9/452 717/113 |
| 5,953,010 A * | 9/1999 | Kampe | ............... | G06F 9/451 717/125 |
| 6,329,994 B1 * | 12/2001 | Gever | ............... | G06T 13/20 345/620 |
| 6,425,120 B1 * | 7/2002 | Morganelli | ............ | G06F 9/542 717/109 |

(Continued)

FOREIGN PATENT DOCUMENTS

WO  WO 2018/140053 A1  8/2018

OTHER PUBLICATIONS

Feng et al, "Auto-Icon: An Automated Code Generation Tool for Icon Designs Assisting in UI Development", ACM, pp. 59-69 (Year: 2021).*

(Continued)

*Primary Examiner* — Anil Khatri
(74) *Attorney, Agent, or Firm* — Sterne, Kessler, Goldstein & Fox P.L.L.C.

(57) ABSTRACT

Disclosed herein are system, method, and computer program product embodiments for automatically generating unique icons for applications on an application exchange platform based on application property representations. An automatic icon generation tool receives a selection of an application on the application exchange platform. The application includes one or more properties. A property representation is determined for the application based on the one or more properties of the application. A unique icon is generated for the application based on the property representation. The unique (Continued)

icon includes one or more characteristics and a characteristic of the one or more characteristics of the unique icon corresponds to a part of the property representation. The unique icon is displayed for the application on the application exchange platform.

20 Claims, 9 Drawing Sheets
(2 of 9 Drawing Sheet(s) Filed in Color)

(56) References Cited

U.S. PATENT DOCUMENTS

| | | | | |
|---|---|---|---|---|
| 6,701,513 | B1* | 3/2004 | Bailey | G06F 8/38 |
| | | | | 717/109 |
| 7,046,848 | B1* | 5/2006 | Olcott | G06V 30/274 |
| | | | | 382/284 |
| 7,171,648 | B1* | 1/2007 | Finocchio | G06F 9/451 |
| | | | | 345/581 |
| 7,702,636 | B1* | 4/2010 | Sholtis | G06F 16/256 |
| | | | | 707/999.1 |
| 8,117,591 | B1* | 2/2012 | Michelsen | G06F 8/34 |
| | | | | 717/109 |
| 8,429,612 | B2* | 4/2013 | Milov | G06F 11/3692 |
| | | | | 717/124 |
| 11,132,418 | B2* | 9/2021 | Semerad | G06F 16/986 |
| 11,190,411 | B1* | 11/2021 | Comazzetto | H04L 41/40 |
| 11,669,896 | B2* | 6/2023 | Van Os | G06F 3/0482 |
| | | | | 705/42 |
| 11,797,153 | B1* | 10/2023 | Candelore | G06F 40/20 |
| 2011/0023014 | A1* | 1/2011 | Harper | G06F 8/70 |
| | | | | 717/110 |
| 2018/0192117 | A1 | 7/2018 | Liston et al. | |
| 2020/0159787 | A1 | 5/2020 | Chernenkov et al. | |

OTHER PUBLICATIONS

Zhao et al, "ICONATE: Automatic Compound Icon Generation and Ideation", ACM, pp. 1-13 (Year: 2020).*

Setlur et al, "Automatic Generation of Semantic Icon Encodings for Visualizations", ACM, pp. 541-550 (Year: 2014).*

Shih et al, "An ICON Programming Technique for Multimedia Present at ion Designs", IEEE, pp. 1678-1682 (Year: 1997).*

Lv et al, "Research on Automatic Recognition Method of Icon Style", IEEE, pp. 931-935 (Year: 2021).*

Zhang et al, "Multimodal Icon Annotation For Mobile Applications", ACM, pp. 1-11 (Year: 2021).*

International Search Report and Written Opinion of the International Searching Authority directed to related International Patent Application No. PCT/US2022/013507, mailed Oct. 10, 2022; 12 pages.

* cited by examiner

APPLICATION ICON GENERATION BASED ON UNIQUE APPLICATION PROPERTY
REPRESENTATION

BACKGROUND

Technical Field

One or more implementations relate to the field of Application Programming Interfaces (APIs), and more specifically, to application icon generation based on unique application property representation.

Background Art

As connectivity between computer and mobile devices continues to develop, applications have been developed that communicate and share information. Commonly, applications may communicate via an Application Programming Interface (API). An API is a software interface offering a service to other programs to communicate data. APIs may have several different components, such as specifications, markdown documents, icons, etc. that constitute part of an API's development. As APIs continue to be developed and utilized, many large enterprise organizations may develop or implement dozens or even hundreds of APIs. These APIs may exist at varying stages of an API development lifecycle. For example, some APIs may have been publically released and implemented by customers or consumers; some APIs may be released as a test build or beta; and other may be still in internal testing or development.

The APIs can be applications displayed on an application exchange platform implemented on an application exchange system. The application exchange platform may be an application marketplace or online store allowing consumers to install, implement, and/or download applications, which may include services, software, extensions, and/or programs. The application exchange platform may also allow developers to test or develop the APIs. For the APIs that have been released, developers may continue updating or patching APIs with newer versions on the application exchange platform. The applications and/or APIs on the application platform can also be referred to as "assets." The assets on the application exchange platform may have same default icons. With increasing number of assets on the application exchange platform, developers and consumers may find it difficult to visually locate a target asset in the large number of assets on the application exchange platform.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
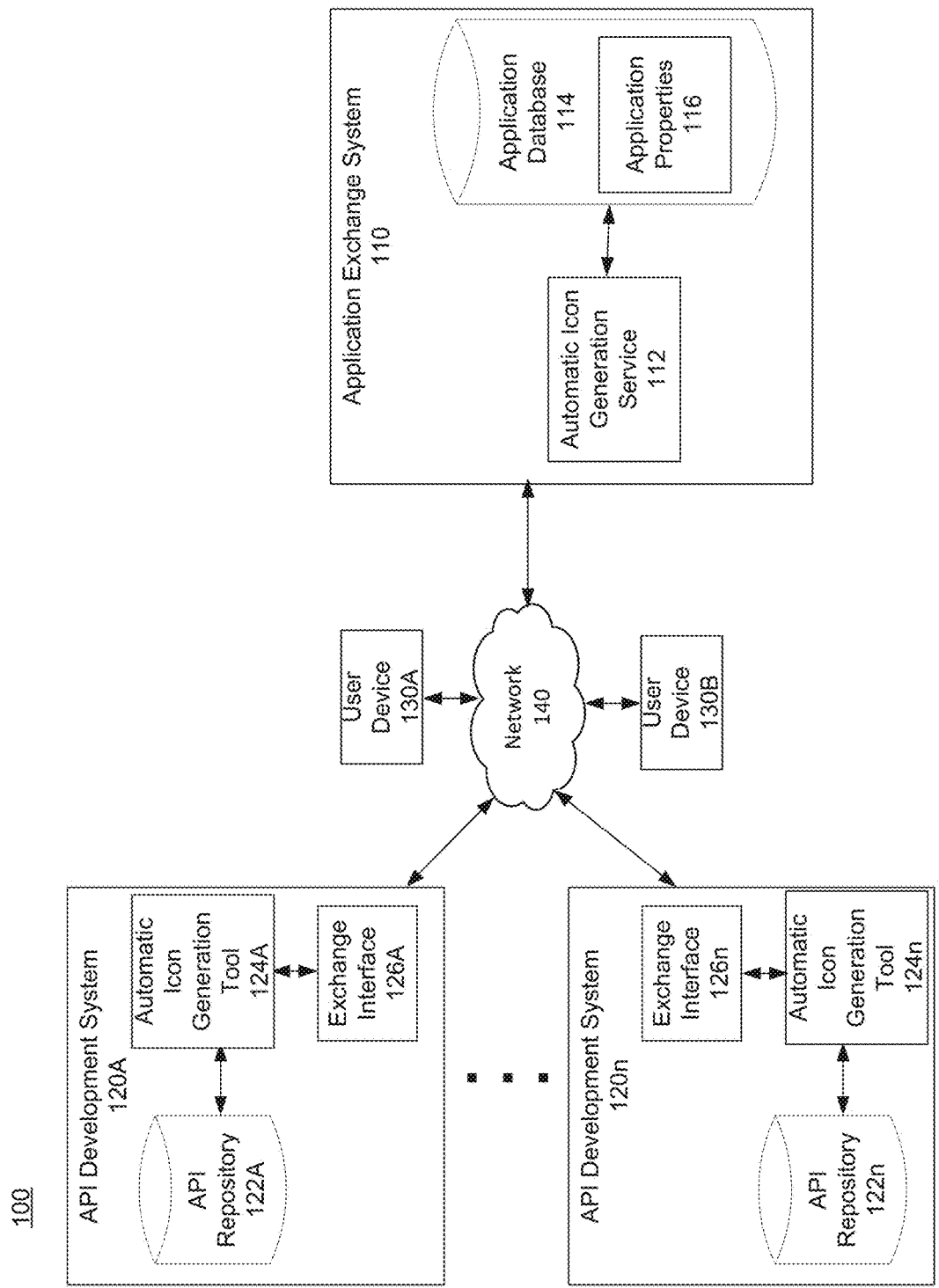
FIG. 1 depicts a block diagram of an Application Programming Interface (API) icon generation environment, according to some embodiments.

Provided herein are system, apparatus, device, method and/or computer program product embodiments, and/or combinations and sub-combinations thereof, for automatically generating asset icons based on unique application property representations.

In some embodiments, automatic icon generation tool is used to generate unique icons for assets on an application exchange platform. The automatic icon generation tool may be implemented using a command line interface (CLI) and/or an application service. The visual characteristics of the generated unique icons can correspond to application properties of the assets on the application exchange platform. The application exchange platform can be implemented on an application exchange system. The application exchange platform may be an application marketplace or online store allowing consumers to install, implement, and/or download applications, which may include services, software, extensions, and/or programs. The applications may have corresponding APIs with API specifications. The application exchange platform may also allow developers to test or develop the APIs.

The automatic icon generation tool can be implemented at an API development system on either a server side or a developer side. The tool can traverse a file repository that stores API and other files and analyzes those files to retrieve metadata information of the assets. Once an asset is selected on the application exchange platform for generating a unique icon, the automatic icon generation tool can retrieve the application properties of the selected asset. Each property of the selected asset can be assigned a weight based on the importance of the property. The weighted properties of the asset can be shuffled non-randomly to form a string of weighted properties. In some embodiments, the automatic icon generation tool can shuffle the weighted properties in the string to spread the weighted properties across the string. In some embodiments, the process of shuffling the weighted properties can be optional and the automatic icon generation tool may not need to shuffle the string. The automatic icon generation tool can transform the string of shuffled properties into a unique asset "DNA" using hexadecimal conversion. The asset DNA can represent the application properties of the asset.

With the unique asset DNA representing the application properties of the asset, the automatic icon generation tool can divide the unique asset DNA into a number of zones. Each zone can correspond to a characteristic of a unique icon for the asset. The number of zones can correspond to a number of characteristics of the unique icon. In some embodiments, each zone of the unique asset DNA can have an equal number of hexadecimal digits. In some embodiments, filler digits can be added to the end of the unique asset DNA so that each zone can have an equal number of digits. The automatic icon generation tool can convert the hexadecimal values in the number of zones into integers. Integers can better represent icon characteristics in a range than hexadecimals. The integers can be mapped to the characteristics of the unique icon proportionally based on a ratio of the value of the integer to the range of the integer. The automatic icon generation tool can generate a unique icon for the asset based on the unique asset DNA. Each characteristic of the icon can correspond to each zone of the unique asset DNA, which are determined based on the application properties of the asset.

Implementing the automatic icon generation tool can provide unique icons for assets on the application exchange platform for users to efficiently locating a target asset. For example, when the assets have default icons, users may find it difficult to locate the target asset. With unique icons for the assets on the application exchange platform, the users can quickly locate the target asset by the visual characteristics of the unique icons. In addition, resemblances between two unique icons can indicate common properties between corresponding assets. In some embodiments, the unique icons can be visually grouped by common visual characteristics. With the unique icons for the assets on the application exchange platform, the users can differentiate the assets on the application exchange platform by the visual characteristics of the unique icons and quickly identify the target asset by a visual search. The user can use the visual characteristics to filter the assets on the application exchange platform and quickly locate the target asset. The characteristics of the unique icons correspond to application properties of the assets.

The automatic icon generation tool can automatically determine unique asset DNAs for the assets based on the application properties and generate the unique icons for the assets based on the unique asset DNAs. In this manner, the automatic icon generation tool can more efficiently display the assets on the application exchange platform in computer systems and/or enterprise computer systems. Additionally, implementing the automatic icon generation tool in a development pipeline provides continuous integration and continuous deployment (CI/CD) of new and updated assets on the application exchange platform. As developers continue to update assets or release new versions, the automatic icon generation tool may continue to update the unique icons for the assets. By implementing the automatic icon generation tool, API development systems may streamline the icon generation for assets on the application exchange platform. Further, implementing the automatic icon generation tool allows developers to focus on building and implementing assets. This automation of icon generation for the assets on the application exchange platform reduces wasted computer resources corresponding to developer intervention.

Various embodiments of these features will now be discussed with respect to the corresponding figures.

FIG. 1 depicts a block diagram of an Application Programming Interface (API) icon generation environment 100, according to some embodiments. API icon generation environment 100 includes application exchange system 110, API development systems 120A-120n (collectively referred to as API development system 120), user devices 130A and 130B (collectively referred to as user device 130), and/or network 140.

Application exchange system 110 may be implemented using computer system 900 as further described with reference to FIG. 9. For example, application exchange system 110 may be implemented using one or more servers and/or databases. Application exchange system 110 may communicate with user device 130 and/or API development system 120 over network 140. Network 140 may include any combination of Local Area Networks (LANs), Wide Area Networks (WANs), and/or the Internet.

Application exchange system 110 may provide an application exchange platform. The application exchange platform may be an application marketplace or online store allowing consumers to install, implement, and/or download applications, which may include services, software, extensions, and/or programs. The application exchange platform may also be a cloud-based application marketplace. This may allow users to identify applications to implement into cloud-based computing platforms. The applications may have corresponding APIs with API specifications. The application exchange platform may also allow developers to test or develop the APIs. Application exchange system 110 publishes the API specifications on the application exchange platform for viewing and/or use by consumers or implementers of the API.

The consumers or implementers may use a user device 130 to access application exchange system 110 via network 140. User device 130 may be a desktop personal computer, workstation, laptop, Personal Digital Assistant (PDA), smartphone, smartwatch, wearable device, augmented reality (AR) device, virtual reality (VR) device, and/or computer system 900. Using user device 130, users may access application exchange system 110 to view or browse applications, APIs, and/or API specifications. Application exchange system 110 may generate one or more graphical user interfaces (GUIs) for display on user device 130 to display data corresponding to the applications, APIs, and/or API specifications. An exemplary GUI of application exchange system 110 is described with reference to FIG. 5. Application exchange system 110 may store the data in application database 114. Application database 114 can include application properties 116 for the applications. Application properties 116 can include metadata information of the applications, such as organizations, asset names, asset types, and creation dates. When a user device 130 accesses application exchange system 110, application properties 116 may be retrieved from application database 114, formatted, and transmitted to user device 130 for viewing. User device 130 may also install, implement, and/or download applications via the GUIs. The applications may utilize the APIs corresponding to the API specifications.

To display the applications on the GUI, application exchange system 110 includes an automatic icon generation service 112 to generate icons for the applications. Automatic icon generation service 112 identifies APIs within the API repository 122, stores the application properties 116 for the APIs in application database 114, determine unique property representations (e.g., asset DNAs) for the APIs based on application properties 116, and generate icons for displaying the APIs based on the unique property representations, which will be discussed in further detail below. Application database 114 stores the applications, APIs, and corresponding application properties 116. In some embodiments, automatic icon generation service 112 may be a messaging interface configured to exchange messages and/or data packets with API development system 120. In some embodiments, automatic icon generation service 112 may include its own automatic icon generation tool 124. Provided that the automatic icon generation tool within application exchange system 110 is given access to the customer-side API repository 122, the automatic icon generation tool within application exchange system 110 can also perform the automatic icon generation of customer APIs.

One or more API development systems 120 may provide APIs to application exchange system 110. An API development system 120 may be a computer system, a cloud-computing system, an enterprise system, a server, and/or other computer device allowing an API developer to draft APIs and their numerous different component files. In some embodiments, an API development system 120 may be implemented using computer system 900 as further described with reference to FIG. 9.

In some embodiments, the customer may store the various components of a given API within API repository 122. Either on command, or automatically (depending on implementation), automatic icon generation tool 124 can retrieve the APIs and the application properties of the APIs from API repository 122. Specifically, during automatic icon generation, the automatic icon generation tool 124 can retrieve application properties from API repository 122 and automatically generate icons for the APIs, without customer input or customization. In some embodiments, this mode is carried out by a server-side automatic icon generation tool located in the application exchange system 110 or elsewhere at a provider of the automatic icon generation service.

In some embodiments, automatic icon generation tool 124 may be implemented using a command-line interface (CLI) and/or a service or program executed by the API development system 120. In some embodiments, a customer of API development system 120 may implement automatic icon generation tool 124 in an API development pipeline. The customer may be DevOps engineer and/or a customer responsible for software development and/or IT operations.

In some embodiments, the customer can initiate automatic icon generation tool 124 to locate the APIs and application properties within the API repository 122. The files can be provided to the customer in a list. The customer can review the list and edit it as desired to generate a descriptor file. API development system 120 can use an exchange interface 126 and/or automatic icon generation tool 124 to provide the descriptor file to application exchange system 110 via network 140. Exchange interface 126 may communicate with automatic icon generation tool 124 to validate API specifications and/or application properties. As previously explained, automatic icon generation service 112 may be a messaging interface configured to exchange messages and/or data packets with API development system 120. This may occur via exchange interface 126. In some embodiments, automatic icon generation service 112 may be an API utilized by an API development system 120 to automatic generate unique icons for applications. Application exchange system 110 can use the descriptor file to retrieve the APIs and application properties and store them to application database 114.

In some embodiments, the customer may use the descriptor file to designate APIs to be monitored, cataloged, or published. The descriptor file may identify APIs and/or corresponding application properties stored in API repository 122. API repository 122 may be one or more memory devices or databases storing elements of an API and other computer files. In some embodiments, properties of an API may be stored in multiple API repositories 122 corresponding to an API development system 120. For example, while API repository 122A is depicted as a single memory device, API repository 122A may be implemented as multiple memory devices storing different components or elements of an API. Further, different API development systems 120 may have different API repository 122 configurations. The API may be divided and/or segmented into different files. In some embodiments, the descriptor file generated at an API development system 120 may designate the one or more API repositories 122 including the one or more API files.

The descriptor file may also identify metadata of the APIs. The metadata may be used by application exchange system 110 to determine application properties 116 of the APIs and to generate unique property representations of the APIs. In some embodiments, the descriptor file and/or the API may include the metadata. The metadata may include, for example, tags, categories, organizations, asset names, asset types, creation dates, and/or other metadata used for cataloging and publishing the APIs. Automatic icon generation tool 124 may use this metadata to generate unique icons for the APIs.

Figure 2:
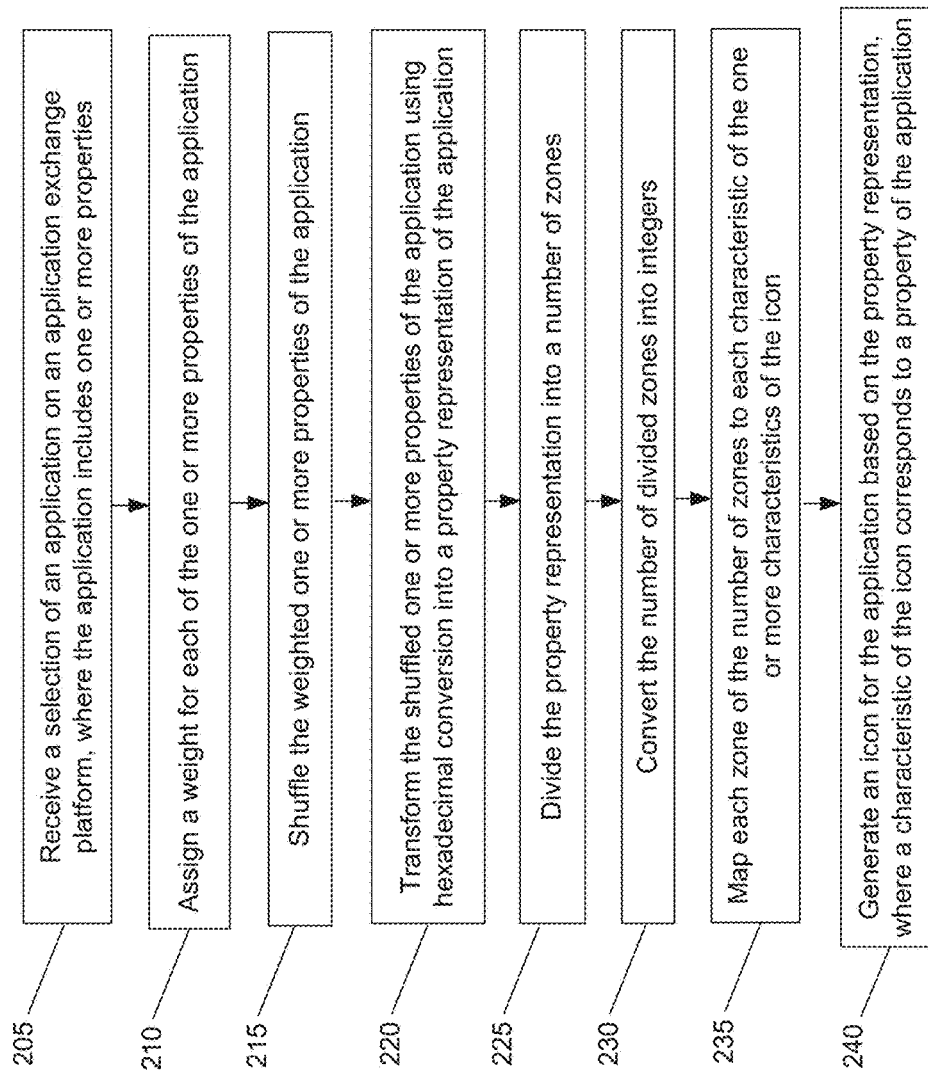
FIG. 2 depicts a flowchart diagram of an exemplary method for automatically generating icons based on unique application property representations, according to some embodiments.

FIG. 2 depicts a flowchart diagram of a method 200 for automatically generating icons based on unique application property representations, according to some embodiments. Method 200 shall be described with reference to FIGS. 1 and 3-8; however, method 200 is not limited to the example embodiment.

In an embodiment, automatic icon generation tool 124 may utilize method 200 to generate unique icons for applications based on unique application property representations. While method 200 is described with reference to automatic icon generation tool 124, method 200 may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

Figure 3:
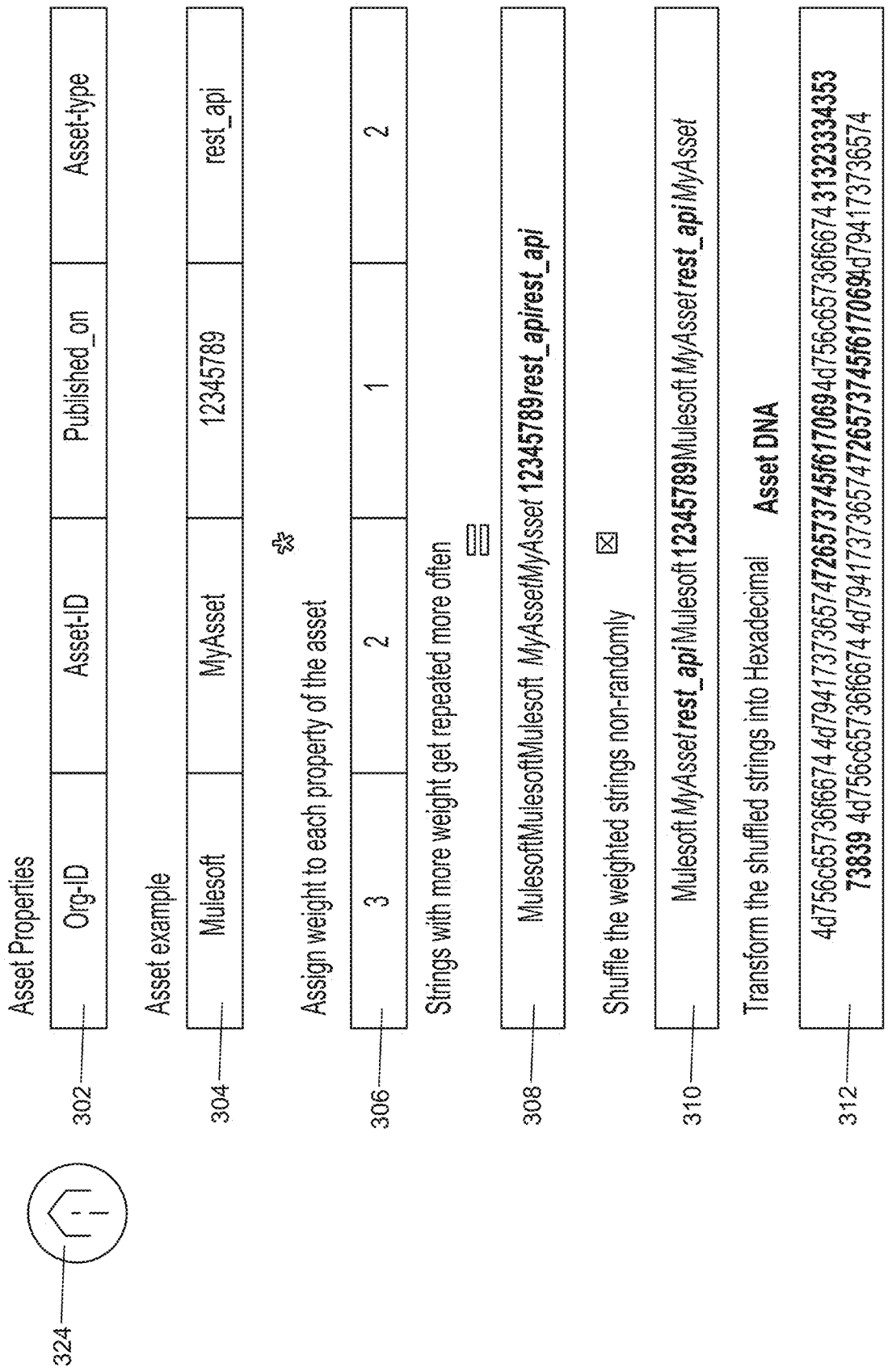
FIG. 3 depicts a flowchart diagram of determining a unique application property representation for an exemplary asset, according to some embodiments.
Figure 5:
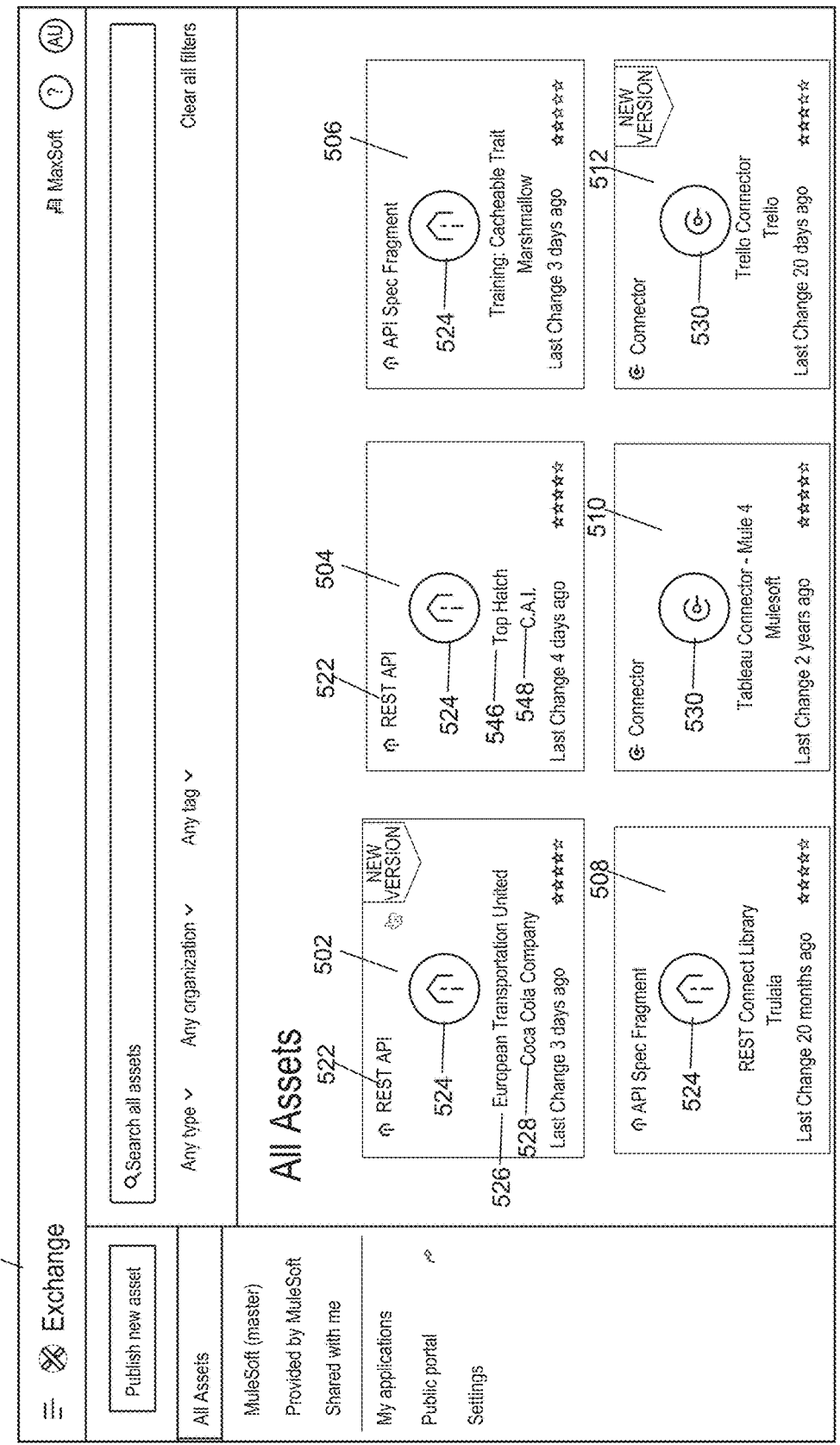
FIG. 5 depicts a Graphical User Interface (GUI) of an exemplary application exchange platform having assets with default icons, according to some embodiments.

At 205, automatic icon generation tool 124 may receive a selection of an application on an application exchange platform for automatic unique icon generation. The application includes one or more properties. For example, as shown in FIG. 5, application exchange platform 500 can include assets 502-512. Assets 502-512 can include application properties, such as organizations, asset names, asset types, and creation dates. In some embodiments, asset 502 can include an asset type 522, an asset name 526, and an organization ID 528 displayed on application exchange platform 500. Asset 504 can include asset type 522, an asset name 546, and an organization ID 548 displayed on application exchange platform 500. In some embodiments, as shown in FIG. 3, asset properties 302 can include org-ID, asset-ID, published_on, and asset-type. An example asset 304 can have an organization ID of Mulesoft, an asset ID of MyAsset, a publishing time of 12345789, and an asset type of rest_api. Asset 304 can have a default icon 324.

Referring to FIG. 5, application exchange platform 500 can display each of assets 502-512 with an icon. For example, assets 502, 504, 506, and 508 can have a same default icon 524. Assets 510 and 512 can have a same default icon 530. In some embodiments, multiple assets with different application properties can have a same default icon on application exchange platform 500. The default icon can be based on the asset type. For example, assets 502 and 504 can have a same asset type 522 but different organization IDs and different asset names. Asset 502 and asset 504 has a same default icon 524 on application exchange platform 500. With the increase of the number of assets on application exchange platform 500, users may find it difficult to locate a target asset having a default icon on application exchange platform 500.

Figure 6:
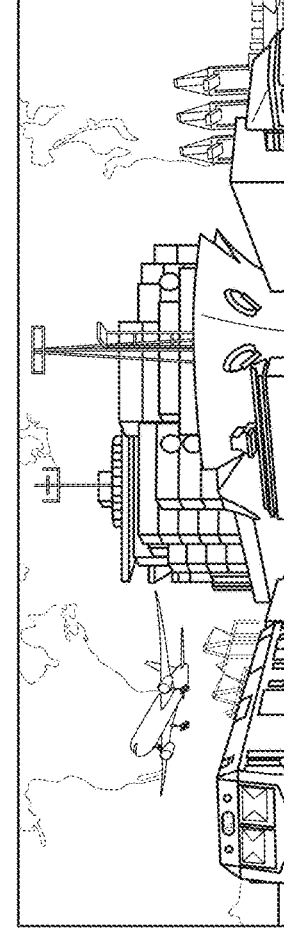
FIG. 6 depicts a GUI of an exemplary asset on the exemplary application exchange platform, according to some embodiments.

In some embodiments, automatic icon generation tool 124 can generate a unique icon for a selected asset. For example, as shown in FIG. 6, the users can select asset 502 to generate a unique icon for asset 502. Automatic icon generation tool 124 can receive the selection of asset 502 and retrieve application properties of asset 502. In some embodiments, automatic icon generation tool 124 can retrieve application properties from API repository 122 on API development system 120. In some embodiments, automatic icon generation service 112 can use automatic icon generation tool 124 and retrieve application properties 116 from application database 114 on application exchange system 110.

At 210, automatic icon generation tool 124 can assign a weight to each of the one or more properties of the application. For example, as shown in FIG. 3, each property of asset 304 can be assigned a weight. Table 306 can illustrate exemplary weights assigned to each property of asset 304. The organization ID of Mulesoft is assigned a weight of 3, the asset ID of MyAsset is assigned a weight of 2, the publishing time of 12345789 is assigned a weight of 1, and the asset type of rest_api is assigned a weight of 2. In some embodiments, the weight for a property can be determined by an importance of the property. For example, an organization may have multiple assets with different asset names. The organization ID of a target asset can be more important than the asset name for quickly locating the target asset of the organization on an application exchange platform. As a result, the org-ID property Mulesoft can have a greater weight than the asset-ID property MyAsset. In addition, the publishing time may have the least importance for quickly locating the target asset. Therefore, the published_on property 12345789 can have the lowest weight 1.

With the weight for each property of asset 304, the properties of asset 304 can be transformed into a string 308. Each property of asset 304 can be repeated by a number of its weight. For example, the org-ID property Mulesoft can have a weight of 3. Therefore, string 308 may include Mulesoft repeated by three times. Similarly, string 308 can also include MyAsset repeated by two times, 12345789 repeated by one time, and rest_api repeated by two times.

At 215, automatic icon generation tool 124 can shuffle the weighted one or more properties of the application. For example, as shown in FIG. 3, string 308 having the weighted properties can be shuffled non-randomly to form string 310. In some embodiments, automatic icon generation tool 124 can shuffle the weighted properties in string 308 to spread the weighted properties across string 310. As shown in shuffled string 310, each property of asset 304 can be spread across string 310. In some embodiments, the process of shuffling the weighted properties can be optional and automatic icon generation tool 124 may not need to shuffle string 308. In some embodiments, compared with no shuffle, shuffle can spread the difference of properties between different applications across shuffled string 310. This can lead to more changes of the unique icons for the applications, as will be discussed in further detail below.

At 220, automatic icon generation tool 124 can transform the shuffled one or more properties of the application using hexadecimal conversion into a property representation of the application. For example, as shown in FIG. 3, the shuffled string 310 can be transformed using hexadecimal conversion into an asset DNA 312 for asset 304. Asset DNA 312 can be a unique property representation of asset 304. Referring to FIG. 3, organization id "Mulesoft" can be transformed into 4d756c65736f6674, asset ID "MyAsset" can be transformed into 4d794173736574, asset type "rest_api" can be transformed into 726573745f617069, and publishing time "12345789" can be transformed into 3132333435373839.

Figure 4:
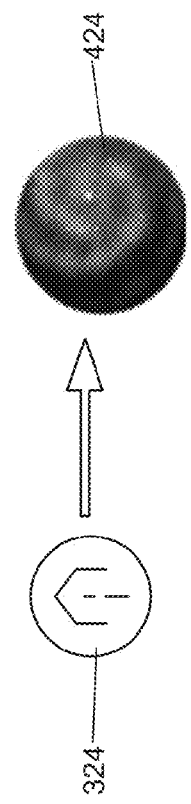
FIG. 4 depicts a flowchart diagram of generating an icon for the exemplary asset based on the unique application property representation, according to some embodiments.

At 225, automatic icon generation tool 124 can divide the property representation into a number of zones. For Example, as shown in FIG. 4, asset DNA 312 can be divided into nine zones to express characteristics of unique icon 424 for asset 304. The number of zones can be determined based on the number of characteristics of unique icon 424 for asset 304. Each zone in divided asset DNA 412 can have an equal number of hexadecimal digits. As shown in FIG. 4, asset DNA 312 can include 138 hexadecimal digits. The divided asset DNA 412 can have sixteen digits in each zone from zone 1 to zone 8 and ten digits for zone 9. In some embodiments, filler digits can be added to the end of divided asset DNA 412 so that each zone can have a same number of digits. For example first six digits of zone 1 (i.e., 4d756c) can be added to zone 9 of divided asset DNA 412 to make up sixteen digits for zone 9. In some embodiments, zone 9 can express the least important characteristic for asset 304. Therefore, the filler digits may not have a significant effect on the characteristic expressed by zone 9. In some embodiments, the filler digits can be designated with specific hexadecimal numbers, such as 666666.

At 230, automatic icon generation tool 124 can convert the number of divided zones into integers. For example, as shown in FIG. 3, divided zones 1-9 of divided asset DNA 412 can be converted to divided integer zones 414. In some embodiments, integers can better represent icon characteristics in a range than hexadecimals. In some embodiments, the integers for each zone can have a same number of digits. For example, each zone in divided integer zones 414 can have eleven digits. If the integer converted from the hexadecimal in a zone of divided asset DNA 412 has more than eleven digits, the first eleven digits can be used for the zone in divided integer zones 414. For example, zone 1 of divided asset DNA 412 has 4d756c65736f6674. The corresponding integer for zone 1 is 5581486496179775092. Divided integer zones 414 can use the first eleven digits 55814864961 to represent one characteristic of unique icon 424. In some embodiments, divided integer zones 414 can have all the number of digits or other portions of integer to represent the characteristics of unique icon 424.

At 235, automatic icon generation tool 124 can map each zone of the number of zones to each characteristic of the one or more characteristics of unique icon 424. For example, as shown in FIG. 4, unique icon 424 can be a nebula picture and can have characteristics 416 including brightness, red, green, blue, zoom, rotation, galaxy year, temp max, and temp min. Zone 1-9 of divided integer zones 414 can map to each characteristics of characteristics 416. In some embodiments, unique icon 424 can be other suitable pictures including multiple characteristics, for example, minim, fuse, uncode, trees, clouds, animals, etc.

The integers of each property in divided integer zones 414 can be proportionally mapped to each of characteristics 416 based on a ratio of the value of the integer to a range of the integer. For example, characteristic red can have a range from 0 to 255. The integer of asset 304 mapped to red are 55825651772, in a range from 0 to 99999999999. Therefore, the value for characteristic red of unique icon 424 can be calculated by 255×(55825651772/99999999999). Similarly, the values for each characteristic of characteristics 416 can be calculated proportionally from the integers of each property in divided integer zones 414.

Figure 7:
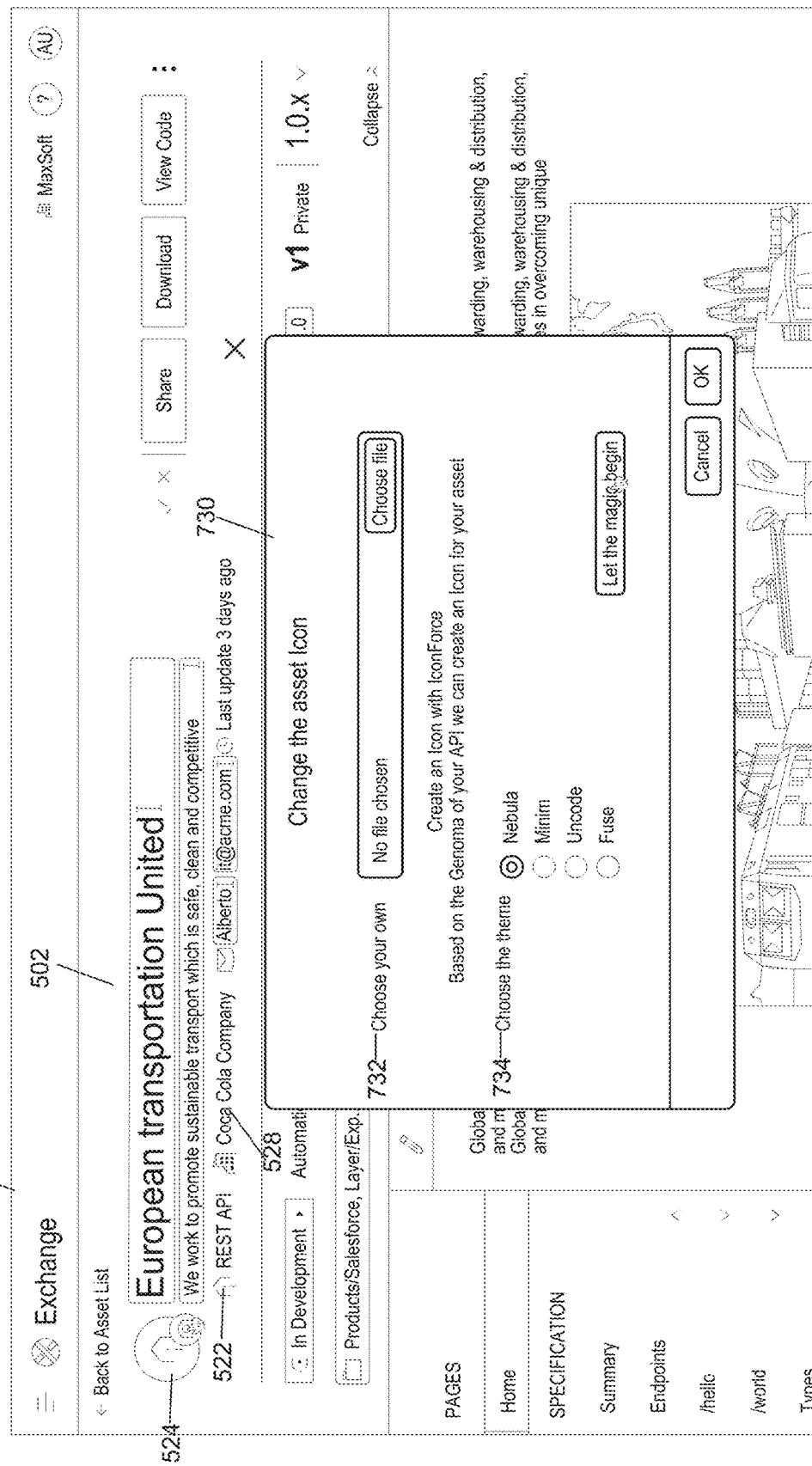
FIG. 7 depicts a GUI of generating an icon for the exemplary asset based on a unique application property representation, according to some embodiments.

At 240, automatic icon generation tool 124 can generate an icon for the application for display on application exchange platform 500 based on the property representation. Each characteristic of the one or more characteristics of the icon corresponds to a property of the application. For example, as shown in FIG. 4, automatic icon generation tool 124 can use the values of each characteristics of characteristics 416 to generate unique icon 424 for asset 304. In another example shown in FIG. 7, the users can click on icon 524 to change the default icon for asset 502 to a unique icon. As shown in FIG. 7, window 730 can be displayed on application exchange platform 500. The users can choose their own pictures for the unique icon by clicking option 732. The users can also choose a theme by clicking option 734 and automatic icon generation tool 124 can generate a unique icon based on asset DNA of asset 502. With option 734, the users can quickly assigning a unique icon for an asset. Referring to FIG. 7, the users can choose nebula them in option 734 to generate a unique icon for asset 502.

Figure 8:
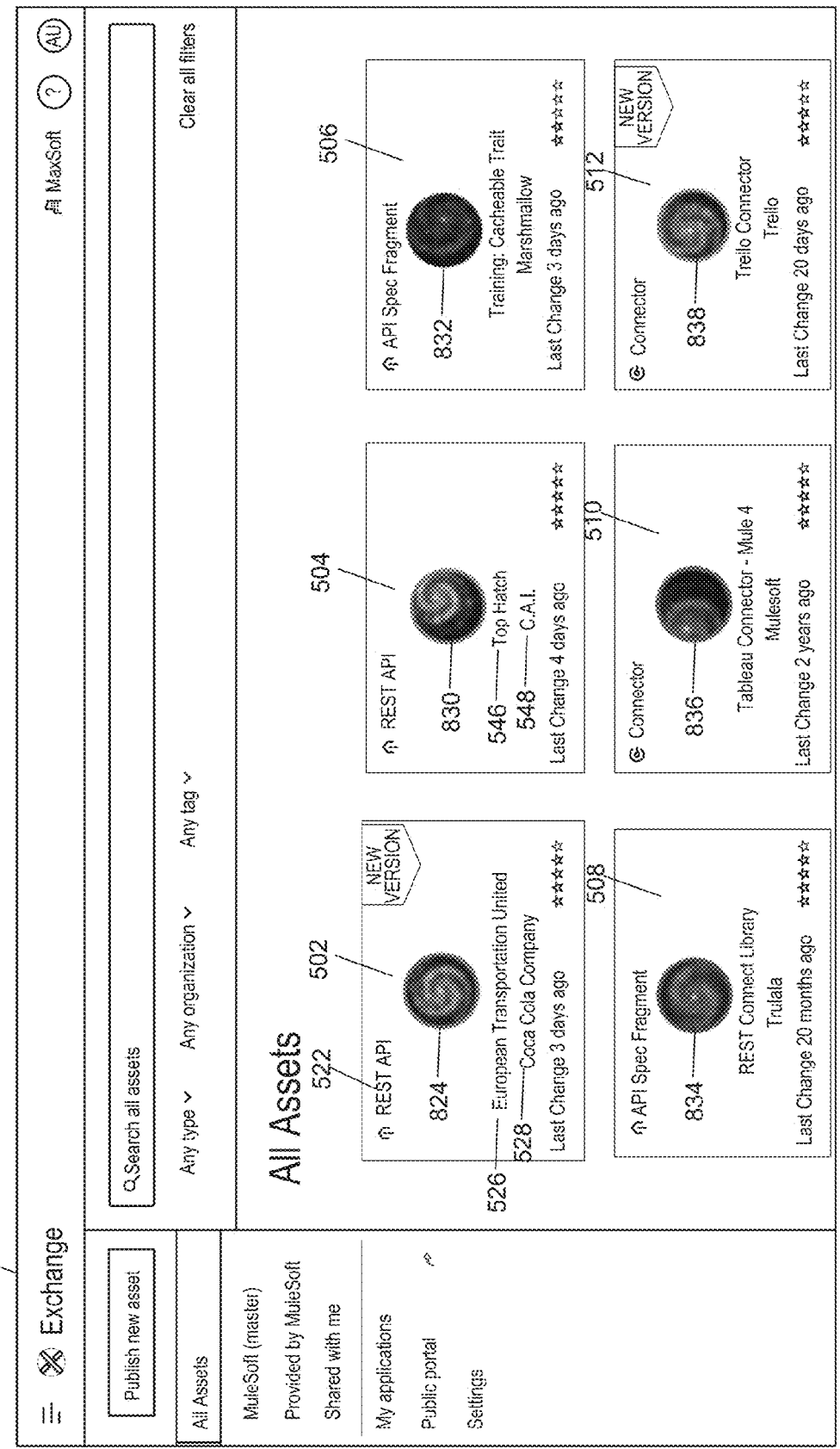
FIG. 8 depicts a GUI of an exemplary application exchange platform having assets with unique icons generated based on unique application property representations, according to some embodiments.

FIG. 8 depicts a GUI of application exchange platform 500 having assets 502-512 with unique icons generated based on unique asset DNAs, according to some embodiments. As shown in FIG. 8, each asset of assets 502, 504, 506, 508, 510 and 512 can have corresponding unique icons 824, 830, 832, 834, 836, and 838, respectively. In some embodiments, if two assets have a common property, the corresponding unique icons of the two assets can have a common characteristic. For example, as shown in FIG. 8, assets 502 and 504 can have a same asset type of rest_api. Corresponding unique icons 824 and 830 can have a common color of green. Similarly, unique icons 832 and 834 can have a common color of purple as assets 506 and 508 has a common asset type of API spec fragment. Unique icons 836 and 838 can have a common color of blue as assets 506 and 508 has a common asset type of connector. Therefore, resemblances between two unique icons can indicate common properties between corresponding assets. In some embodiments, the unique icons can be visually grouped by common visual characteristics. For example, as shown in FIG. 8, the unique icons with common colors can be grouped on application exchange platform 500 to aid the users in locating an asset with a different asset type. In some embodiments, assets having a common application properties can have different visual characteristics based on other application properties. For example, asset 502 and asset 504 have a same asset type 522 but different organization IDs and different asset names. Unique icons 824 and 830 can have different nebula pictures with different brightness and different rotations.

In some embodiments, the automatically generated unique icons on application exchange platform 500 can assist a user's visual search of a target asset. With unique icons for assets 502-512, the user can easily locate the target asset visually based on the characteristics of the unique icons, which correspond to application properties of the asset. The user can use the visual characteristics to filter the assets on application exchange platform 500 and quickly locate the target asset.

Automatic icon generation tool 124 can automatically determine unique asset DNAs for assets 502-512 on application exchange platform 500 and generate unique icons 824, 830, 832, 834, 836, and 838 for assets 502-512 based on their unique asset DNAs. In this manner, automatic icon generation tool 124 can more efficiently display assets 502-512 on application exchange platform 500. Additionally, implementing automatic icon generation tool 124 in a development pipeline provides continuous integration and continuous deployment (CI/CD) of new and updated assets on application exchange platform 500. As developers continue to update assets or release new versions, automatic icon generation tool 124 may continue to update the unique icons for the assets on application exchange platform 500. By implementing automatic icon generation tool 124, API development systems 120 may streamline the icon generation for the assets on application exchange platform 500. Further, implementing automatic icon generation tool 124 allows developers to focus on building and implementing assets. This automation of icon generation for the assets on application exchange platform 500 reduces wasted computer resources corresponding to developer intervention.

Figure 9:
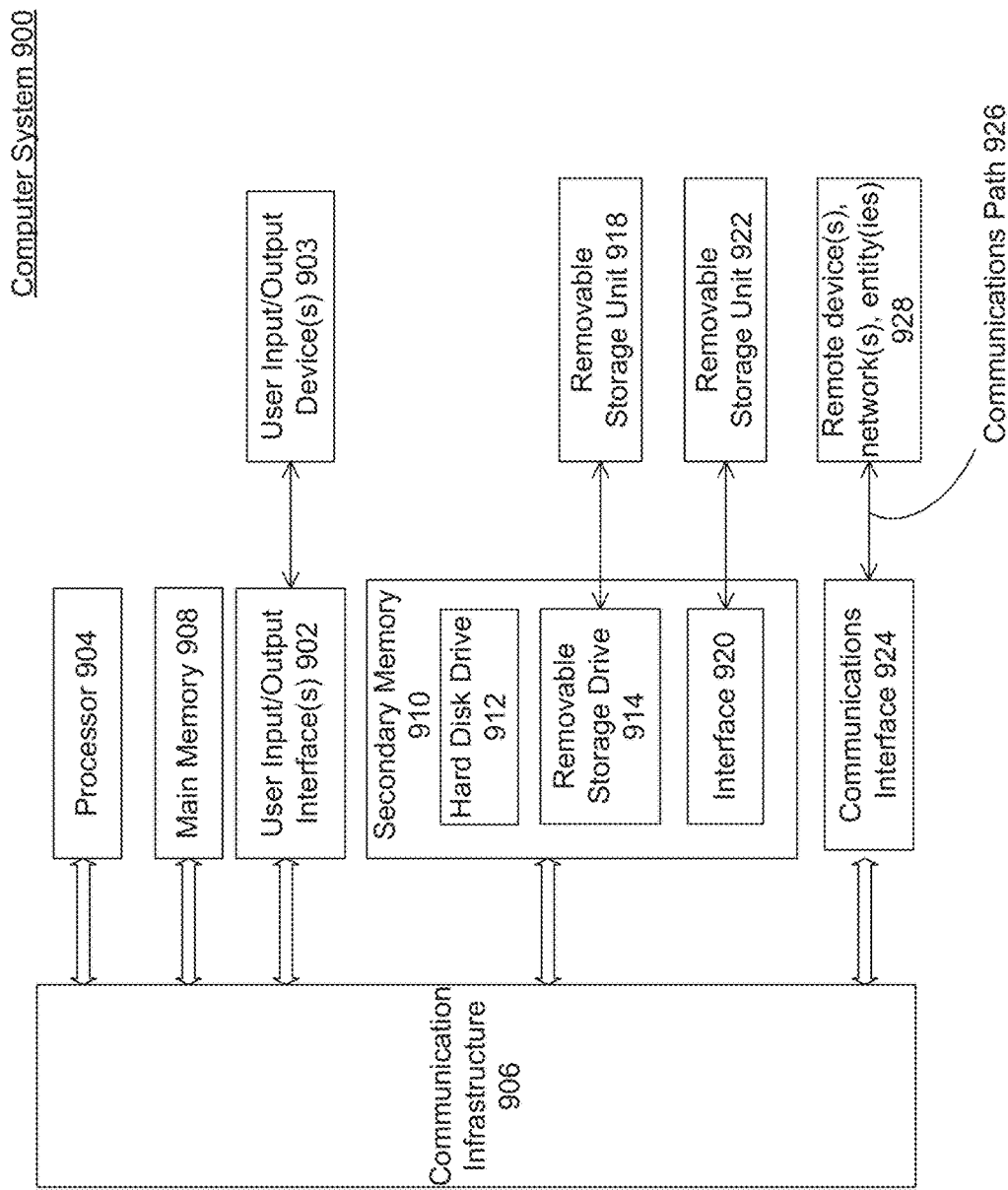
FIG. 9 depicts an example computer system useful for implementing various embodiments.

Various embodiments may be implemented, for example, using one or more well-known computer systems, such as computer system 900 shown in FIG. 9. One or more computer system 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method, comprising:
   receiving, by one or more processors, a selection of an application on an application exchange platform for icon generation on a graphical user interface (GUI), wherein the application includes one or more properties;

processing, by the one or more processors, the one or more properties of the application to generate a property representation for the application, wherein the property representation comprises a sequence of symbols divided into a first number of zones;

generating, by the one or more processors in response to the generation of the property representation for the application, an icon for the application for display on the application exchange platform on the GUI based on the property representation, wherein the icon includes a second number of visual characteristics equal to the first number; and mapping, by the one or more processors, each visual characteristic of the second number of visual characteristics to symbols in each zone of the first number of zones.

2. The method of claim 1, wherein processing the one or more properties of the application to generate the property representation of the application comprises assigning a weight to each of the one or more properties of the application based on an importance of the corresponding property.

3. The method of claim 2, wherein processing the one or more properties of the application to generate the property representation comprises shuffling positions of the weighted one or more properties of the application in the property representation.

4. The method of claim 1, wherein processing the one or more properties of the application to generate the property representation of the application comprises transforming the one or more properties of the application into the property representation of the application using hexadecimal conversion.

5. The method of claim 4, wherein generating the icon for the application comprises dividing the property representation of the application into the first number of zones, wherein each of the first number of zones includes an equal number of digits.

6. The method of claim 5, wherein generating the icon for the application comprises:
converting hexadecimals in the first number of zones into integers,
wherein the visual characteristic is proportional to a value of the integer in a corresponding zone.

7. The method of claim 1, further comprising generating an additional icon for an additional application on the application exchange platform, wherein the icon and the additional icon include a common visual characteristic for a common property between the application and the additional application.

8. An automatic icon generation system for generating an icon of an application on an application exchange platform, comprising:
a common repository that stores application properties of the application; and
a computing device communicatively coupled to the common repository having one or more processors configured to:
access the common repository;
receive a selection of the application on the application exchange platform for icon generation on a graphical user interface (GUI), wherein the application includes one or more properties stored in the common repository;

process the one or more properties of the application to generate a property representation for the application, wherein the property representation comprises a sequence of symbols divided into a first number of zones;

generate, in response to the generation of the property representation for the application, an icon for the application for display on the application exchange platform on the GUI based on the property representation,
wherein the icon includes a second number of visual characteristics equal to the first number; and
map each visual characteristic of the second number of visual characteristics to symbols in each zone of the first number of zones.

9. The automatic icon generation system of claim 8, wherein processing the one or more properties of the application to generate the property representation of the application comprises assigning a weight to each of the one or more properties of the application based on an importance of the corresponding property.

10. The automatic icon generation system of claim 9, wherein processing the one or more properties of the application to generate the property representation comprises shuffling positions of the weighted one or more properties of the application in the property representation.

11. The automatic icon generation system of claim 8, wherein processing the one or more properties of the application to generate the property representation of the application comprises transforming the one or more properties of the application into the property representation of the application using hexadecimal conversion.

12. The automatic icon generation system of claim 11, wherein generating the icon for the application comprises dividing the property representation of the application into the first number of zones, wherein each of the first number of zones includes an equal number of digits.

13. The automatic icon generation system of claim 12, wherein generating the icon for the application comprises:
converting hexadecimals in the first number of zones into integers,
wherein the visual characteristic is proportional to a value of the integer in a corresponding zone.

14. The automatic icon generation system of claim 8, wherein the one or more processors is further configured to generate an additional icon for an additional application on the application exchange platform, wherein the icon and the additional icon include a common visual characteristic for a common property between the application and the additional application.

15. A non-transitory computer-readable device having instructions stored thereon that, when executed by at least one computing device, cause the at least one computing device to perform operations comprising:
receiving a selection of an application on an application exchange platform for icon generation on a graphical user interface (GUI), wherein the application includes one or more properties;
processing the one or more properties of the application to generate a property representation for the application, wherein the property representation comprises a sequence of symbols divided into a first number of zones;
generating, in response to the generation of the property representation for the application, an icon for the application for display on the application exchange platform based on the property representation on the GUI, wherein the icon includes a second number of visual characteristics equal to the first number; and mapping each visual characteristic of the second number of visual characteristics to symbols in each zone of the first number of zones.

16. The non-transitory computer-readable device of claim 15, wherein processing the one or more properties of the application to generate the property representation of the application comprises assigning a weight to each of the one or more properties of the application based on an importance of the corresponding property.

17. The non-transitory computer-readable device of claim 16, wherein processing the one or more properties of the application to generate the property representation comprises shuffling positions of the weighted one or more properties of the application in the property representation.

18. The non-transitory computer-readable device of claim 15, wherein processing the one or more properties of the application to generate the property representation of the application comprises transforming the one or more properties of the application into the property representation of the application using hexadecimal conversion.

19. The non-transitory computer-readable device of claim 18, wherein generating the icon for the application comprises dividing the property representation of the application into the first number of zones, wherein each of the first number of zones includes an equal number of digits.

20. The non-transitory computer-readable device of claim 19, wherein generating the icon for the application comprises:

converting hexadecimals in the first number of zones into integers, wherein the visual characteristic is proportional to a value of the integer in a corresponding zone.

\* \* \* \* \*